United States Patent
Eads et al.

(10) Patent No.: US 12,290,753 B2
(45) Date of Patent: May 6, 2025

(54) ADAPTIVE TIME DILATION BASED ON PLAYER PERFORMANCE

(71) Applicant: Sony Interactive Entertainment Inc., Tokyo (JP)

(72) Inventors: Joshua M. Eads, San Mateo, CA (US); Matthew D. Bennett, San Mateo, CA (US); Brendan Matera Rehon, San Mateo, CA (US); Mahdi Azmandian, San Mateo, CA (US); Zhenhao Ge, San Mateo, CA (US); Todd Tokubo, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 939 days.

(21) Appl. No.: 16/674,827

(22) Filed: Nov. 5, 2019

(65) Prior Publication Data

US 2021/0129031 A1 May 6, 2021

(51) Int. Cl.
*A63F 13/67* (2014.01)
*A63F 13/45* (2014.01)

(52) U.S. Cl.
CPC .............. *A63F 13/67* (2014.09); *A63F 13/45* (2014.09)

(58) Field of Classification Search
CPC ................................. A63F 13/67; A63F 13/45
See application file for complete search history.

(56) References Cited

U.S. PATENT DOCUMENTS

| | | | |
|---|---|---|---|
| 2011/0306396 A1* | 12/2011 | Flury | A63F 13/44 463/7 |
| 2012/0009997 A1* | 1/2012 | Youm | A63F 13/335 463/42 |
| 2014/0155156 A1* | 6/2014 | Peck | A63F 13/847 463/31 |
| 2017/0259177 A1* | 9/2017 | Aghdaie | G06Q 30/02 |
| 2018/0184936 A1* | 7/2018 | Han | A63F 13/355 |

OTHER PUBLICATIONS

International Search Report and Written Opinion dated Feb. 1, 2021, from the counterpart PCT application PCT/US20/58431.

* cited by examiner

*Primary Examiner* — Thomas H Henry
(74) *Attorney, Agent, or Firm* — John L. Rogitz

(57) ABSTRACT

The performance of a player of a computer game is noted and the player accorded a latency handicap based thereon. The latency handicap is used to slow down play of the computer game, preferably only during times of high player activity. The latency handicap can be reduced over time or owing to improvement in the player's performance.

8 Claims, 5 Drawing Sheets

700

12A

JOHN WANTS YOU TO PLAY SUPERHERO:
CAN YOU BEAT HIM? ~702

→ USE HIS LATENCY HANDICAP ~704

→ USE MY LATENCY HANDICAP ~706

FIG. 7

ADAPTIVE TIME DILATION BASED ON PLAYER PERFORMANCE

FIELD

The application relates generally to technically inventive, non-routine solutions that are necessarily rooted in computer technology and that produce concrete technical improvements.

BACKGROUND

As understood herein, computer game players have unique physiological latencies for motor controls as well as mental latency based on physiological capability and game expertise. As further understood herein, differences in latencies in inputting game commands typically are not accounted for by the game engine.

SUMMARY

Accordingly, a system includes at least one computer simulation controller and at least one computer simulation source configured to receive input from the computer simulation controller to control presentation of a computer simulation presented on at least one display. The computer simulation source, which may be implemented by a network server or a simulation console, includes at least one processor and at least one storage accessible to the processor with instructions executable by the processor to receive at least first and second input from the computer simulation controller. The instructions are executable to, based on the first and second input, identify performance of a player over time, and then based at least in part on the performance, adaptively slow down play of the computer simulation during first times of simulation presentation requiring input and not second times of simulation presentation.

Without limitation, the first times include any one or more of crowd source input times, simulation times at which prior players experienced difficulty satisfying a threshold, critical times defined by a developer of the computer simulation, and critical times defined by input latency satisfying a threshold period. If desired, the instructions can be executable to speed up simulation presentation based at least in part on improving performance.

In another aspect, a method includes identifying latency in input from a player of a computer simulation, based at least in part on the latency, slowing down presentation to the player of a computer simulation.

In another aspect, an apparatus includes at least one computer storage that is not a transitory signal and that in turn includes instructions executable by at least one processor to receive game play input from a computer simulation controller. The game play input controls at least one character in a computer simulation. The instructions are executable to, based on the game play input, slow down presentation of a computer simulation.

The details of the present application, both as to its structure and operation, can best be understood in reference to the accompanying drawings, in which like reference numerals refer to like parts, and in which:

BRIEF DESCRIPTION OF THE DRAWINGS

FIG. 7 is a screen shot of an example UI allowing the friend to accept the challenge using the friend's or the challenger's handicap.

DETAILED DESCRIPTION

Figure 1:
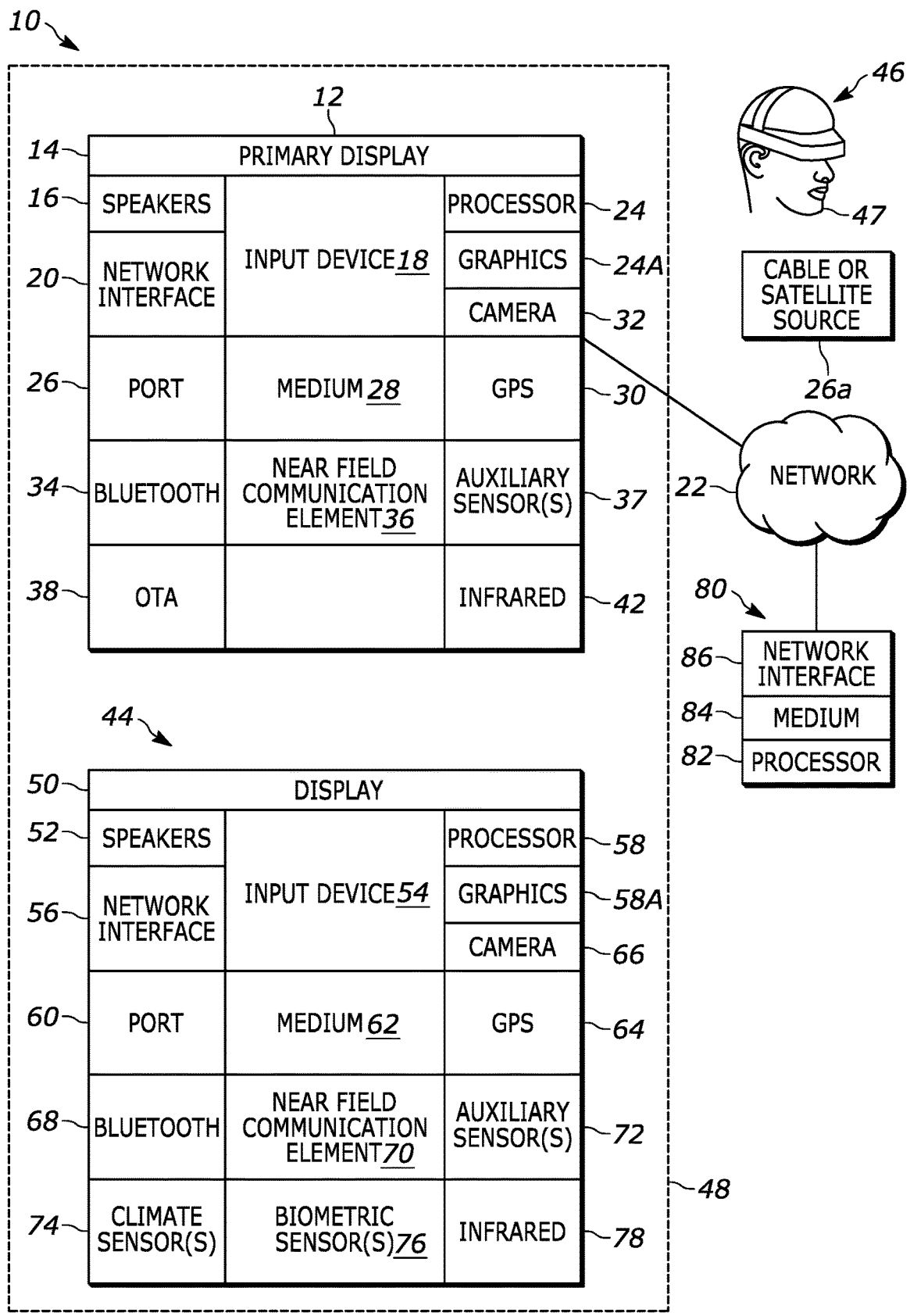
FIG. 1 is a block diagram of an example system including an example in accordance with present principles.

This disclosure relates generally to computer ecosystems including aspects of consumer electronics (CE) device networks such as but not limited to computer simulation networks such as computer game networks as well as standalone computer simulation systems. A system herein may include server and client components, connected over a network such that data may be exchanged between the client and server components. The client components may include one or more computing devices including game consoles such as Sony PlayStation® or a game console made by Microsoft or Nintendo or other manufacturer virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access web sites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social web site to network members.

As used herein, instructions refer to computer-implemented steps for processing information in the system. Instructions can be implemented in software, firmware or hardware and include any type of programmed step undertaken by components of the system.

A processor may be single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors 24 including. A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignation purposes described further below. The source 26a when implemented as a game console may include some or all of the components described below in relation to the CE device 44.

The AVD 12 may further include one or more computer memories 28 such as disk-based or solid state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other CE device types. In one example, a first CE device 44 may be used to send computer game audio and video to the AVD 12 via commands sent directly to the AVD 12 and/or through the below-described server while a second CE device 46 may include similar components as the first CE device 44. In the example shown, the second CE device 46 may be configured as a VR headset worn by a player 47 as shown. In the example shown, only two CE devices 44, 46 are shown, it being understood that fewer or greater devices may be used. For example, principles below discuss multiple players 47 with respective headsets communicating with each other during play of a computer game sourced by a game console to one or more AVD 12.

In the example shown, to illustrate present principles all three devices 12, 44, 46 are assumed to be members of an entertainment network in, e.g., a home, or at least to be present in proximity to each other in a location such as a house. However, present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller, and accordingly may have one or more of the components described below. The first CE device 44 may be a remote control (RC) for, e.g., issuing AV play and pause commands to the AVD 12, or it may be a more sophisticated device such as a tablet computer, a game controller communicating via wired or wireless link with the AVD 12 and/or a game console, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. A graphics processor 58A may also be included. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server or an entire server "farm", and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

The methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the internet.

Figure 2:
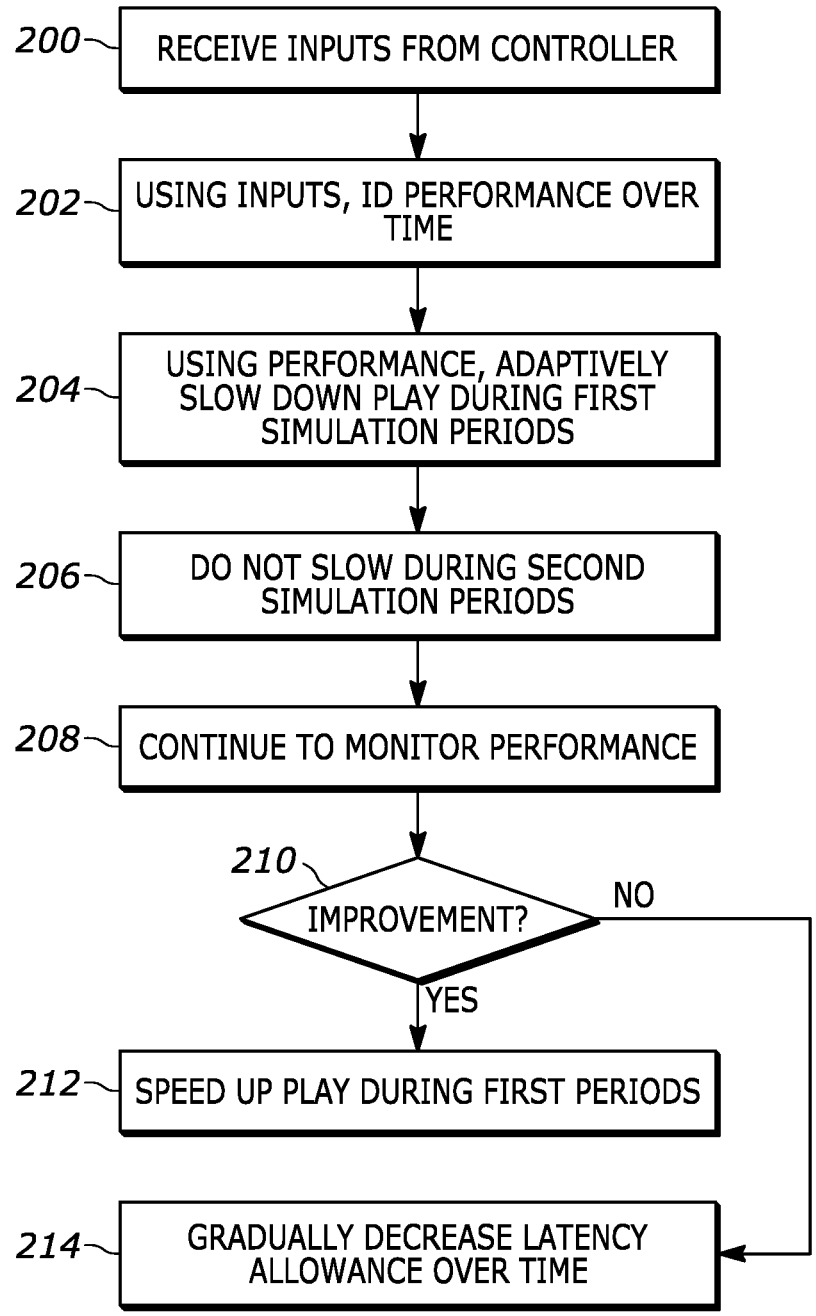
FIG. 2 is a flow chart of example logic consistent with present principles.

Now referring to FIG. 2, commencing at block 200, inputs are received by a server or a simulation console incorporating any of the appropriate components shown in FIG. 1 from a simulation controller or other appropriate input device during simulation play. In general, at least two inputs may be received, with the period between inputs representing a latency characteristic of the player. Or, a single input may be received in response to an event in the computer simulation, with the period between the input and the event representing a latency characteristic of the player. By identifying latencies between multiple inputs and/or multiple event-input combinations, performance in terms of latency characteristic of the player may be identified at block 202.

Moving to block 204, based on the latency-based player performance identified at block 204, a computer simulation being played by the player is adaptively (with respect to the determined latency) slowed down. In one example, the simulation is slowed down only in first periods of play at block 204 and as indicated at block 206 is not slowed down during second periods of play. Without limitation, the first periods may be defined as being periods during which crowd source input is received, e.g., input from multiple observers or spectators. The first periods may be defined as being periods during which prior players of the simulation experienced difficulty satisfying a threshold, e.g., failed to pass to the next chapter of the simulation. Yet again, the first periods may be defined as being periods defined as critical periods by a developer of the computer simulation. Further, the first periods may be defined as being periods defined by input latency satisfying a threshold period. Combinations of the above may be used to define the first periods during which simulation presentation is slowed owing to the player's personal characteristic latency. In other examples the simulation is slowed down over all periods.

Note that a simulation, in addition to being slowed down for latency, also may present certain simulation triggers earlier in the simulation than such triggers otherwise would be presented during normal play. Thus, onscreen instructions/triggers may be advanced for slower players.

Proceeding to block 208, during play of the simulation the player's performance is monitored. If improvement in latency is noted at decision diamond 210, the presentation of the simulation may be automatically increased in speed at block 212. On the other hand, even if improvement in performance as measured by latency does not improve at decision diamond 210, the logic may move to block 214 to gradually speed up simulation presentation by gradually decreasing the latency allowance of the player over time in recognition that people's reaction times naturally improve over the course of a game even if not noticeably identified at decision diamond 210.

Figure 3:
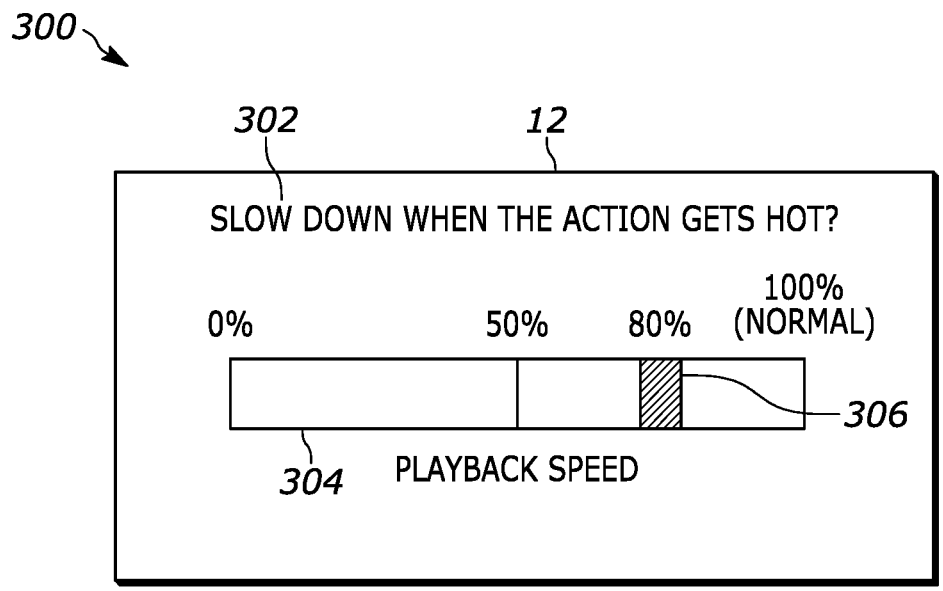
FIG. 3 is a screen shot of an example user interface (UI) allowing a user to establish slow down of presentation of a computer simulation.

FIG. 3 illustrates additional features of principles, in this case embodied in a user interface (UI) 300 that may be presented on, e.g., the display 12 shown in FIG. 1. As shown, the UI 300 can include a prompt 302 asking the player if the player would like to have the simulation slowed during periods of high action that require considerable input on the player's part. A percentage slider 304 may be presented by the UI 300 to allow the player to establish the playback speed desired by the player during such periods, from 0% to 100% of normal speed. In the example shown, the player has set playback speed at 80% of normal as indicated by the location of the slider 306. In the event that the player has over-confidently set playback speed above the player's current latency characteristic as determined in FIG. 2 based on current play, speed of simulation playback may be automatically slowed to assist the player during such critical periods.

Figure 4:
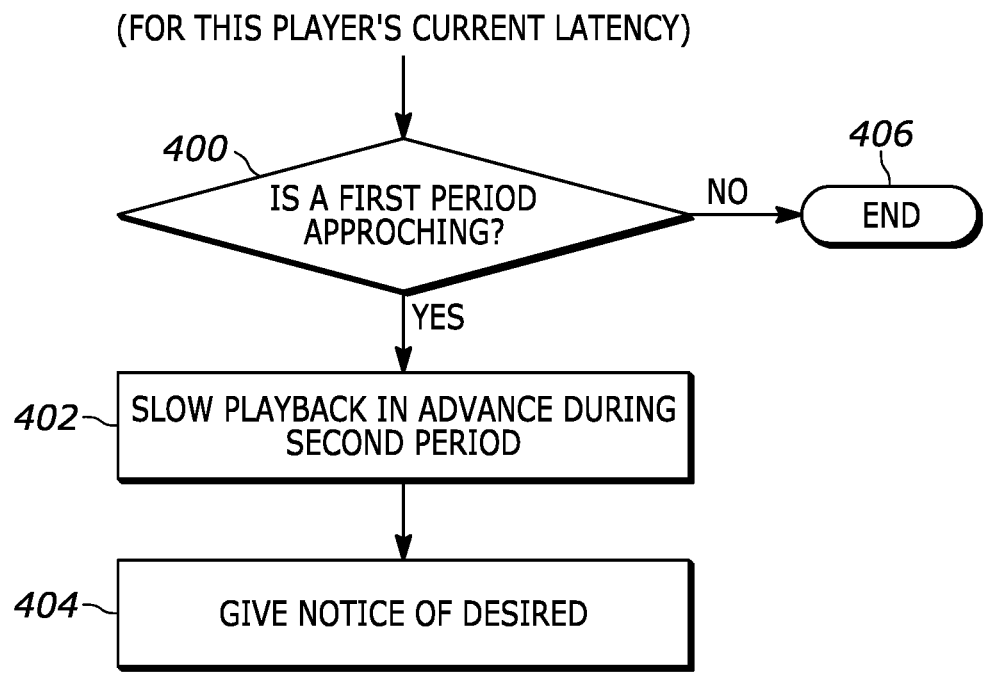
FIG. 4 is a flow chart of example logic to preemptively slow down simulation presentation at the approach of a period of high player activity.

FIG. 4 shows that upcoming challenges in the simulation in the form of the above-discussed critical periods may be identified in advance at decision diamond 400 and simulation presentation slowed down at block 402 even if the slowing occurs near the end of a non-critical period that otherwise does not require slowing based on player latency. This gives "breathing room" to the player to collect thoughts prior to the beginning of a critical period. Notice may be given at block 404 to the player if desired that the game is slowing because of an upcoming critical period. In other embodiments no notice need be given. The no branch to end state 406 from decision diamond 400 simply indicates that state of no critical periods being identified in advance.

Figure 5:
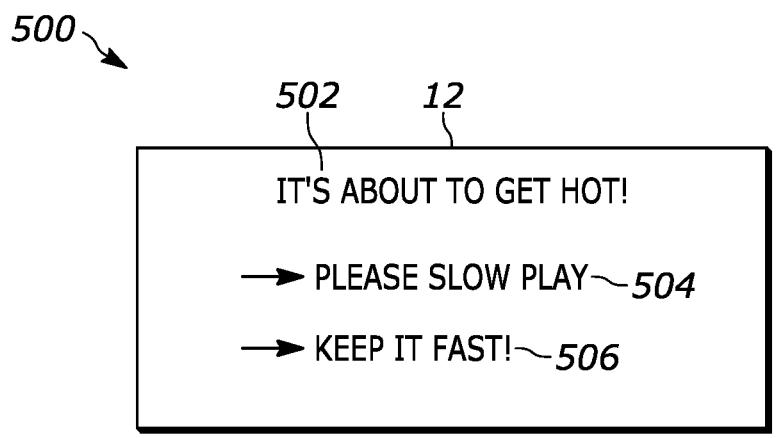
FIG. 5 is a screen shot of an example UI allowing a player to maintain game speed even in the presence of a latency handicap.

FIG. 5 illustrates further. A UI 500 may be presented with an advisory 502 that the simulation is about to require rapid player input. A first selector 504 may be provided to allow the player to elect to slow down simulation presentation according to the latency identified in FIG. 2. Also, a second selector 506 may be provided to allow the player to dispense with the advantage of his or her latency handicap and cause the simulation to be presented at normal speed during the upcoming critical period.

Figure 6:
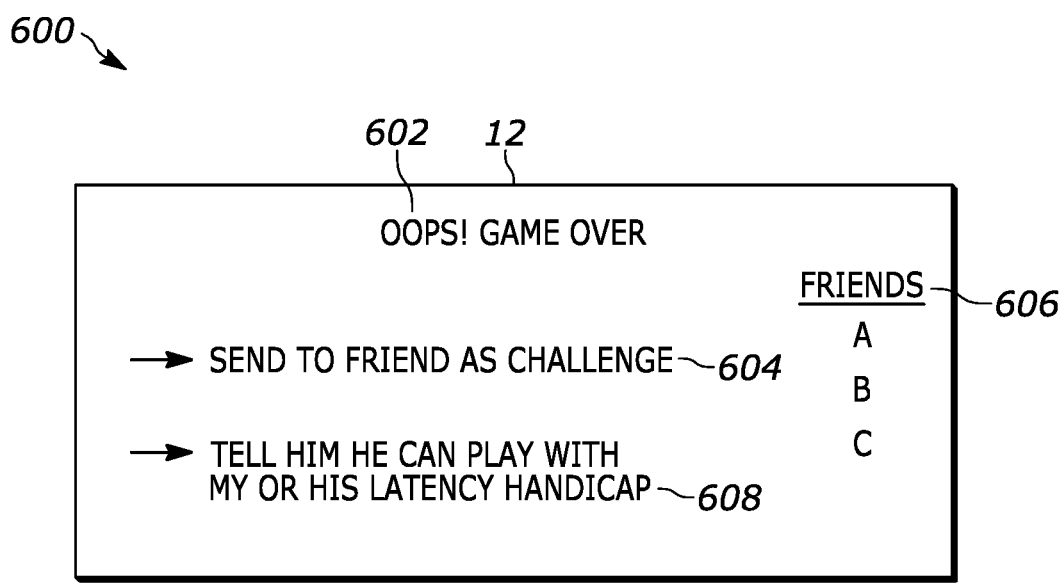
FIG. 6 is a screen shot of an example UI allowing a player to challenge a friend to a simulation.

FIG. 6 illustrates a UI 600 that may be presented when the simulation terminates, e.g., by the failure of the player to advance to the next chapter. An advisory message 602 may be provided that the simulation has ended. A first selector 604 may be provided to allow the player to send a challenge to another player (that may be selected from a list 606) to try his or her luck at the same simulation. A second selector 608 may be provided to direct the system to inform the challengee that the challengee may play the simulation using the challenger's latency handicap or the challengee's latency handicap.

FIG. 7 illustrates an example resulting UI 700 that may be presented on the challengee's device. An advisory 702 is presented indicating that a named challenger has invited the challengee to play a named simulation/A first selector 704 may be provided to allow the challengee to select to play the simulation using the challenger's latency handicap. Also, a second selector 706 may be provided to allow the challengee to select to play the simulation using the challengee's latency handicap. Thus, the simulation may be provided in any desired state to the challengee, e.g., at the beginning, at the location the challenger lost, etc., so that the challengee can pick up the simulation at the provided state.

Note that a player's measured latency may depend on physiological latency of the player plus system latency, e.g., AV transmission and presentation delay. Crowd source data may be used to determine the player's personal physiological latency, which may then be adapted to the measured system latency.

In some implementations, initial latency times for a player as determined in FIG. 2 for example may be presented to the player along with the location in the simulation the player currently is.

It will be appreciated that whilst present principals have been described with reference to some example embodiments, these are not intended to be limiting, and that various alternative arrangements may be used to implement the subject matter claimed herein.

What is claimed is:

1. A method comprising:
   identifying latency in input from a player of a computer simulation
   based at least in part on the latency, slowing down presentation to the player of a computer simulation; and
   responsive to the latency not improving after slowing down presentation of the computer simulation, gradually speeding up simulation presentation.

2. The method of claim 1, wherein the latency is identified at least in part based on based on first and second input to a computer simulation controller.

3. The method of claim 1, comprising:
   slowing down play of the computer simulation during first times of simulation presentation requiring input and not at least some of second times of simulation presentation.

4. The method of claim 3, wherein the first times comprise crowd source input times.

5. The method of claim 3, wherein the first times comprise simulation times at which prior players experienced difficulty satisfying a threshold.

6. The method of claim 3, wherein at least some of the first times are defined by a developer of the computer simulation.

7. The method of claim 3, wherein at least some of the first times are defined by input latency satisfying a threshold period.

8. The method of claim 1, comprising:
   speeding up simulation presentation based at least in part on improving performance.

\* \* \* \* \*